C. R. WASER.
SPHYGMOMANOMETER.
APPLICATION FILED MAY 29, 1915.

1,178,560.

Patented Apr. 11, 1916.

Inventor:
Carl R. Waser,
By C. N. Butler
Attorney

UNITED STATES PATENT OFFICE.

CARL R. WASER, OF PHILADELPHIA, PENNSYLVANIA, ASSIGNOR TO PRECISION THERMOMETER & INSTRUMENT COMPANY, OF PHILADELPHIA, PENNSYLVANIA, A CORPORATION OF PENNSYLVANIA.

SPHYGMOMANOMETER.

1,178,560.   Specification of Letters Patent.   Patented Apr. 11, 1916.

Application filed May 29, 1915. Serial No. 31,089.

*To all whom it may concern:*

Be it known that I, CARL R. WASER, a citizen of the United States, residing in the city of Philadelphia, county of Philadelphia and State of Pennsylvania, have invented certain Improvements in Sphygmomanometers, of which the following is a specification.

My invention relates to means for joining sections and packing joints of sphygmomanometers.

Heretofore difficulty has been experienced in maintaining tight joints proof against liquid, particularly between the hinged sections of reading tubes. No means have been available for effecting the desiderata of satisfactorily holding and providing for readily replacing such packings while permitting unobstructed reading of sectional tubes, and it is the object of my invention to provide means for efficiently effecting these desired ends.

The characteristic features of my improvements will fully appear by reference to the following description and the accompanying drawings in illustration thereof.

Figure 1:
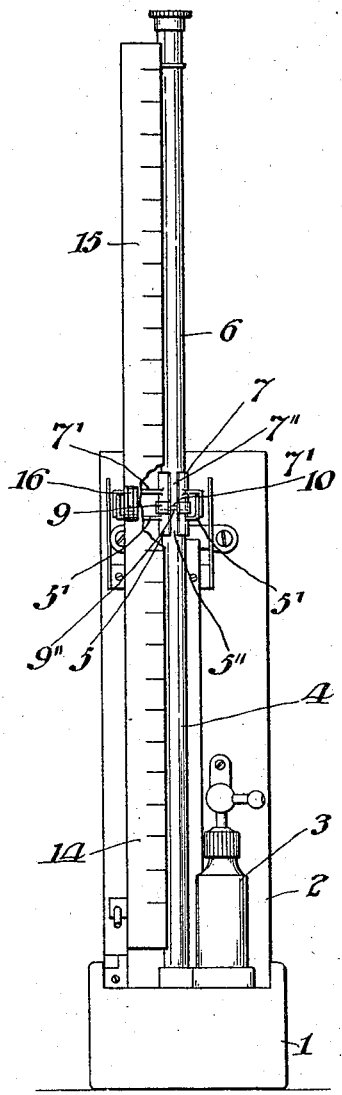
Figure 2:
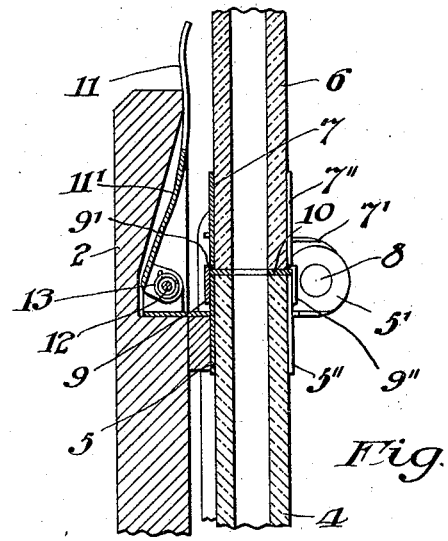
Figures 3, 4:
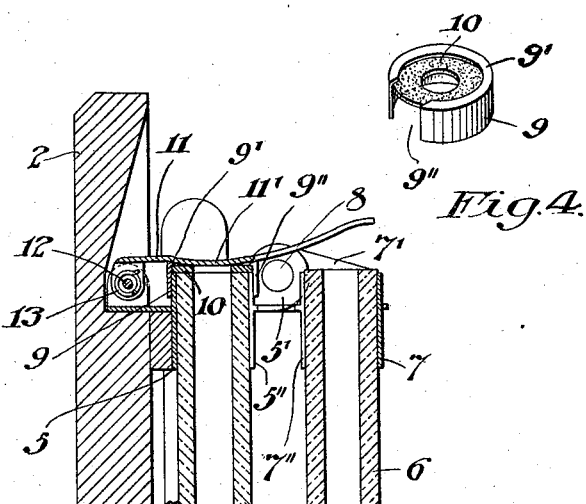

In the drawings, Figure 1 is an elevation of an erected sphygmomanometer embodying my improvements, with part of the scale broken away to illustrate details in the rear thereof; Fig. 2 is a broken vertical sectional view on an enlarged scale, at right angles to the position shown in Fig. 1, of the reading tube joint with connected parts; Fig. 3 is a vertical sectional view of the details shown in Fig. 2, with the parts in the collapsed relation; and Fig. 4 is a perspective view of a detached packing fixture.

The mechanism, as illustrated in the drawings, comprises the case 1 having the hinged lid 2 to the inner face of which is fixed a cistern 3 and a reading tube section 4, the top of the latter being seated in a fenestrated ferrule 5 fixed to the lid. A second reading tube section 6 has its lower end fixed to a fenestrated ferrule 7 which is hinged to the ferrule 5, the ferrule 5 having angular hinge knuckles 5' offset therefrom below the top thereof on opposite sides of the fenestration 5'' and the ferrule 7 having angular hinge knuckles 7' offset therefrom above the bottom thereof on opposite sides of the fenestration 7'' and connected to the knuckles 5' by the pintles 8.

An auxiliary fenestrated ferrule or sectional ring 9, having the inwardly projecting flange 9', is adapted to telescope on the ferrule 5 with its fenestration 9'' in registration with the fenestration 5''. The ferrule or sectional ring 9 is adapted for holding a rubber packing ring 10, which is held therein against the flange 9', the packing ring being engaged between the top of the section 4 and the flange 9'. The tube section 6 extends slightly through the ferrule 7, which registers with the flange 9', the extended end of the tube lying within the flange and pressing against the rubber packing ring 10 in the erected position of the tube section.

A valve 11, having the hinge 12 and the spring 13, is adapted for closing the end of the tube section 4 when the tube section 6 is folded down, the valve being provided with the bulged or dished section 11' which registers with the dished or inwardly inclined outer surface of the flange 9' and presses against the packing ring 10 so as to securely close the tube section 4.

A scale section 14 is connected to the lid 2 and a scale section 15 is connected to the section 14 by a hinge 16 disposed between the complementary knuckles of the tube hinges, the scale being offset from the fenestrations 5'', 7'' and 9'' so that the height of the liquid column can be observed.

Having described my invention, I claim:

1. A sphygmomanometer having a tube section with a fenestrated ferrule thereon, a fenestrated ring telescoped on said ferrule, a packing held by said ring in registration with the end of said tube section, a fenestrated ferrule, means for hinging said ferrules together, and a tube section having an end seated in said ferrule second named and adapted to register with said packing.

2. A sphygmomanometer having tube sections and means whereby said sections are connected, in combination with a ring adapted to be engaged on an end of one of said sections and to register with the other of said sections, and a packing ring engaged by said ring in registration with the end of a tube section aforesaid.

3. A sphygmomanometer having tube sections and means whereby said sections are hinged together, in combination with a device adapted to telescope on an end of one of said sections so as to register with an adjacent end of the other of said sections, and a packing ring engaged by said device to the end of said section on which said device is telescoped and adapted to be pressed by the end of the other of said sections in the erected position thereof.

4. A sphygmomanometer having tube sections and connecting means comprising knuckles joined with adjacent tubes at points removed from the ends thereof, a device engaged to an end of one of said sections between complementary knuckles aforesaid, and a packing held by said device in position for registering with and to be pressed by an end of the other of said sections.

5. A sphygmomanometer having a case with a lid, a fenestrated ferrule connected to said lid, a tube section having an end seated in said ferrule, knuckles on said ferrule removed from said end, a fenestrated ring adapted to telescope on the end of said ferrule, a packing ring adapted to be held by said fenestrated ring against said end, a second fenestrated ferrule having knuckles connected with said knuckles first named, and a tube section having an end seated in said ferrule second named and adapted to press against said packing ring.

6. A sphygmomanometer having tube sections and means whereby said sections are hinged together, in combination with a packing, detachable means for holding said packing between said sections when erected, and a valve adapted for engaging said packing when the sections are in folded relation.

In testimony whereof I have hereunto set my name this 26 day of May, 1915, in the presence of the subscribing witness.

CARL R. WASER.

Witness:
Jos. G. DENNY, Jr.

Copies of this patent may be obtained for five cents each, by addressing the "Commissioner of Patents, Washington, D. C."